US007881566B2

United States Patent
Lees et al.

(10) Patent No.: US 7,881,566 B2
(45) Date of Patent: Feb. 1, 2011

(54) OPTICAL PULSE GENERATOR FOR DISTRIBUTED TEMPERATURE SENSING OPERATING AT A CHARACTERISTIC WAVELENGTH IN A RANGE BETWEEN 1050 NM AND 1090 NM

(75) Inventors: Gareth P. Lees, Southampton (GB); Arthur H. Hartog, Winchester (GB); Peter C. Wait, Salisbury (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 288 days.

(21) Appl. No.: 11/817,821

(22) PCT Filed: Jan. 10, 2006

(86) PCT No.: PCT/GB2006/000081

§ 371 (c)(1),
(2), (4) Date: Jan. 17, 2008

(87) PCT Pub. No.: WO2006/097671

PCT Pub. Date: Sep. 21, 2006

(65) Prior Publication Data

US 2008/0246947 A1    Oct. 9, 2008

(30) Foreign Application Priority Data

Mar. 18, 2005    (GB) .................................. 0505582.7

(51) Int. Cl.
*G02B 6/00* (2006.01)
*G01K 11/00* (2006.01)
*G01J 3/00* (2006.01)
*H01S 3/10* (2006.01)

(52) U.S. Cl. .............................. 385/12; 385/31; 385/41; 385/44; 356/51; 374/161; 372/22; 372/25; 372/26; 372/27; 372/28; 372/29.01; 372/38.02; 372/92; 372/98

(58) Field of Classification Search .................. 385/12, 385/31, 41, 44; 374/161; 356/44, 51; 372/22, 372/25–29.01, 38.02, 92, 98
See application file for complete search history.

(56) References Cited

U.S. PATENT DOCUMENTS 5,504,617 A    4/1996 Spirit (Continued)

FOREIGN PATENT DOCUMENTS

WO    2004/073172    8/2004

OTHER PUBLICATIONS

LUMICS GMBH, "Single Frequency 1064NM Laser Module" Pamphlet.

*Primary Examiner*—Brian M. Healy
*Assistant Examiner*—Guy G Anderson (57) ABSTRACT

An improved laser source for use in a distributed temperature sensing (DTS) system (and DTS systems employing the same) includes a laser device and drive circuitry that cooperate to emit an optical pulse train at a characteristic wavelength between 1050 nm and 1090 nm. An optical amplifier, which is operably coupled to the laser device, is adapted to amplify the optical pulse train for output over the optical fiber sensor of the DTS system. In the preferred embodiment, the laser device operates at 1064 nm and outputs the optical pulse train via an optical fiber pigtail that is integral to its housing. The optical power of the optical pulse train generated by the laser source is greater than 100 mW, and preferably greater than 1 W, at a preferred pulse repetition frequency range between 1 and 50 kHz, and at a preferred pulse width range between 2 and 100 ns.

24 Claims, 4 Drawing Sheets

U.S. PATENT DOCUMENTS

| | | | |
|---|---|---|---|
| 5,592,282 A * | 1/1997 | Hartog | 356/44 |
| 5,963,680 A * | 10/1999 | Kleinerman | 385/12 |
| 5,991,479 A * | 11/1999 | Kleinerman | 385/31 |
| 6,212,310 B1 * | 4/2001 | Waarts et al. | 385/24 |
| 6,380,534 B1 * | 4/2002 | Farhadiroushan et al. | 250/227.14 |
| 6,542,228 B1 * | 4/2003 | Hartog | 356/73.1 |
| 6,853,798 B1 | 2/2005 | Weiss | |
| 7,055,604 B2 | 6/2006 | Jee | |
| 7,283,216 B1 * | 10/2007 | Geng et al. | 356/35.5 |
| 7,350,972 B2 * | 4/2008 | Seebacher et al. | 374/161 |
| 7,508,853 B2 * | 3/2009 | Harter et al. | 372/30 |
| 2003/0156605 A1 | 8/2003 | Richardson | |
| 2005/0199401 A1 | 9/2005 | Patel | |
| 2006/0115204 A1 | 6/2006 | Marsh | |
| 2006/0196659 A1 | 9/2006 | Jee | |
| 2007/0165691 A1 | 7/2007 | Taverner | |
| 2007/0199696 A1 | 8/2007 | Walford | |

* cited by examiner

OPTICAL PULSE GENERATOR FOR DISTRIBUTED TEMPERATURE SENSING OPERATING AT A CHARACTERISTIC WAVELENGTH IN A RANGE BETWEEN 1050 NM AND 1090 NM

BACKGROUND OF THE INVENTION

1. Field of the Invention

This invention relates broadly to fiber optic temperature sensing systems. More particularly, this invention relates to fiber optic distributed temperature sensing systems based on optical time-domain reflectometry.

2. Description of Related Art

Figure 1:
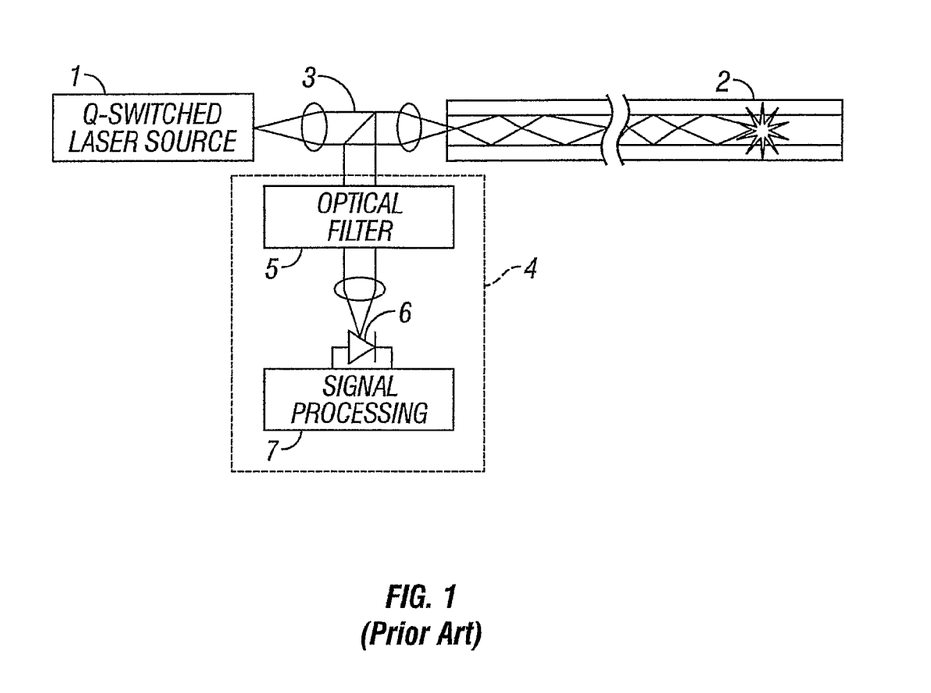
FIG. 1 is a functional block diagram of a prior art fiber optic distributed temperature sensing system based on optical time-domain reflectometry, in which the present invention can be used.
Figure 2:
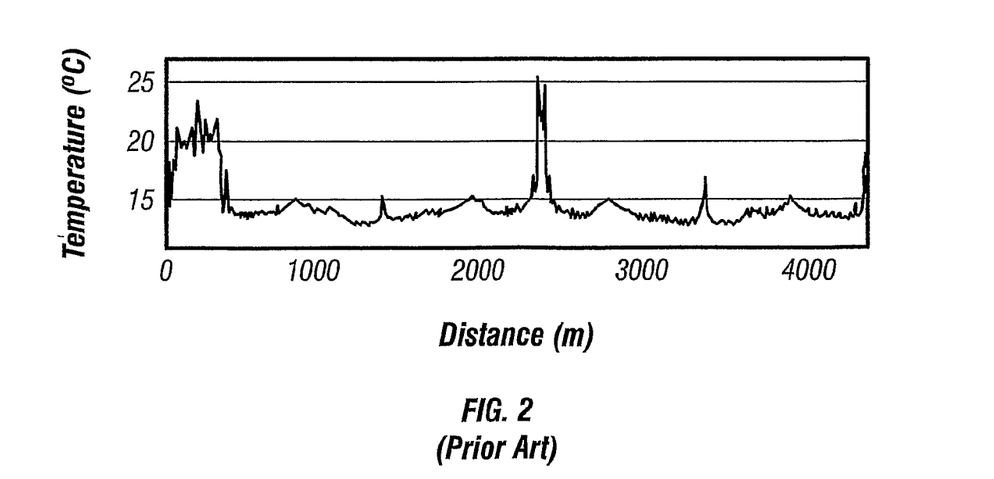
FIG. 2 is a graph that shows the temperature profile along a fiber optic sensor that is derived by the system of FIG. 1 from deviations from the "perfect" exponential decay of backscatter intensity with distance.

Fiber optic distributed temperature sensing (DTS) systems are generally based on optical time-domain reflectometry (OTDR), which is commonly referred to as "backscatter." In this technique as shown in prior art FIG. 1, a pulsed-mode high power laser source 1 launches a pulse of light along an optical fiber 2 through a directional coupler 3. The optical fiber 2 forms the temperature sensing element of the system and is deployed where the temperature is to be measured. This may be along power cables, tunnels, pipelines, oil wells, or other structures. As the pulse propagates along the optical fiber 2 its light is scattered through several mechanisms, including density and composition fluctuations (Rayleigh scattering) as well as molecular and bulk vibrations (Raman and Brillouin scattering, respectively). Some of this scattered light is retained within the fiber core and is guided back towards the source 1. This returning signal is split off by the directional coupler 3 and sent to a highly sensitive receiver 4. In a uniform fiber, the intensity of the returned light shows an exponential decay with time (and reveals the distance the light traveled down the fiber based on the speed of light in the fiber). Variations in such factors as composition and temperature along the length of the fiber show up in deviations from the "perfect" exponential decay of intensity with distance, as shown in the graph of prior art FIG. 2.

Figure 3:
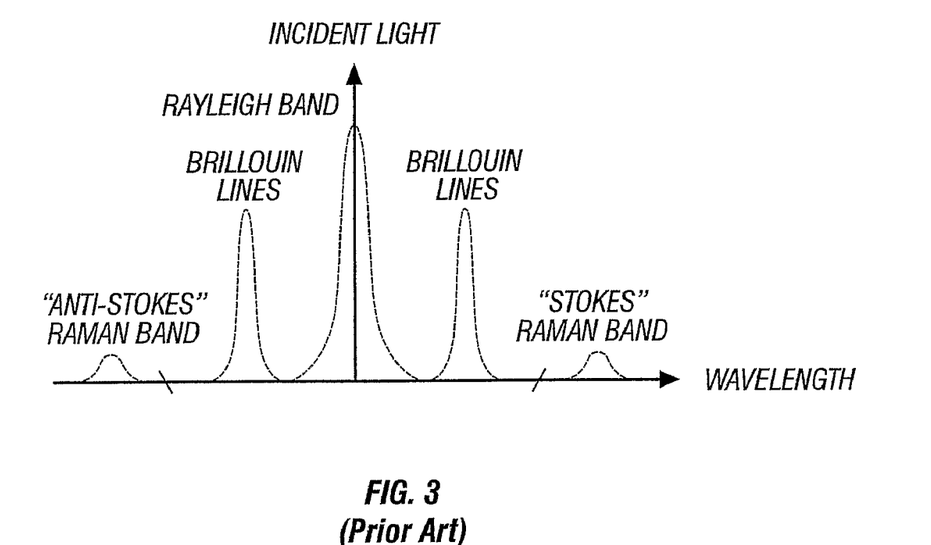
FIG. 3 is a diagram of the backscatter components associated with the optical pulses propagated along the fiber optic sensor in the system of FIG. 1.

The OTDR technique is well established and used extensively in the optical telecommunications industry for qualification of a fiber link or fault location. In such an application, the Rayleigh backscatter signature is examined. As shown in prior art FIG. 3, the Rayleigh backscatter signature is unshifted from the launch wavelength. This signature provides information on loss, breaks, and inhomogeneities along the length of the fiber; and it is very weakly sensitive to temperature differences along the fiber. The two other backscatter components (the Brillouin backscatter signature and the Raman backscatter signature) are shifted from the launch wavelength and the intensity of these signals are much lower than the Rayleigh component as shown in FIG. 3. The Brillouin backscatter signature and the "Anti-Stokes" Raman backscatter signature are temperature sensitive. Either one (or both) of these backscatter signatures can be extracted from the returning signals by the optical filter 5 and detected by detector 6 as shown in prior art FIG. 1. The detected signals are processed by the signal processing circuitry 7, which typically amplifies the detected signals and then converts (e.g., digitized by a high speed analog-to-digital converter) the resultant signals into digital form. The digital signals may then be analyzed to generate a temperature profile along the optical fiber.

The measure of the ability of a DTS system to resolve adjacent temperature features along the length of the optical fiber is known as "spatial resolution" and is critically dependent on the width of the optical pulse. The measure of the ability of the instrument to resolve the temperature of a particular feature is known as "temperature resolution." This is dependent on the signal-to-noise ratio of the received signal, which in turn is dependent upon the pulse power. If the pulse power is too low, the signal-to-noise ratio of the received signal will be degraded. If the pulse power is too high, the fiber response will be non-linear which also results in signal degradation.

As shown in prior art FIG. 1, DTS systems typically employ a Q-switched laser as the laser source. A Q-switched laser obtains high peak power, short duration laser pulses by controlling loop gain in the resonant cavity of the laser. A fast shutter is located between the active medium and the highly reflective mirror. The shutter is closed during pumping to reduce the loop gain to zero and prevent lasing. Since there is no lasing to deplete population inversion, energy stored in the active medium and amplifier gain both reach high values. The shutter is then opened producing a very high loop gain. The resulting high intensity standing wave utilizes the energy stored in the active medium to produce one giant pulse. The Q-switched laser is capable of producing extremely short, high energy output pulses at predictable times; however, it suffers from the following disadvantages. First, the pulse characteristics (width and power) of the pulse generated by the Q-switched laser are fixed by the design of the laser. Hence, a given DTS system will have a fixed spatial resolution. Furthermore, the optical power level of the pulse generated by the Q-switched laser may not be optimal for a particular installation. Second, the assembly of the Q-switched laser source involves the critical alignment of a complex optical assembly which must be maintained within tight tolerances over the lifetime of the system. These stringent requirements can result in relatively poor long term stability and reliability and increased manufacturing costs. Moreover, the parameters of the Q-switched laser tend to interact and thus degradation in one aspect (e.g., pulse power) tends to cause degradation in the others (e.g., pulse duration).

Thus, there remains a need for an improved pulsed-mode high power laser source suitable for use in DTS applications that provides for adjustable pulse characteristics (e.g., width and power), improved long term reliability, and reduced manufacturing costs.

BRIEF SUMMARY OF THE INVENTION

It is therefore an object of the invention to provide a pulsed-mode laser source suitable for use in DTS systems that provides for adjustable pulse characteristics (e.g., width and power).

It is another object of the invention to provide a pulsed-mode laser source suitable for use in DTS systems that provides for improved long term stability and reliability.

It is a further object of the invention to provide a pulsed-mode laser source suitable for use in DTS systems that provides for reduced manufacturing costs.

It is also an object of the invention to provide a DTS system that employs at least one such pulsed-mode laser source.

In accord with these objects, which will be discussed in detail below, a laser source suitable for use in a DTS system includes a laser device and drive circuitry that cooperate to emit an optical pulse train at a characteristic wavelength in a range between 1050 nm and 1090 nm. An optical amplifier, which is operably coupled to the laser device, is adapted to optically amplify the optical pulse train for output over the optical fiber sensor of the DTS system. In the preferred embodiment, the laser device operates at 1064 nm and outputs the optical pulse train via an optical fiber pigtail that is integral to its housing. The optical power of the optical pulse train generated by the laser source is greater than 100 mW, and more preferably greater than 1 W, at a preferred pulse repetition frequency range between 1 and 50 kHz, and at a preferred pulse width range between 2 and 100 ns.

It will be appreciated that such laser devices have become commercially available, and thus significantly reduce the manufacturing costs of the laser source. Moreover, suitable fiber optic pigtailed components have become commercially available, which also affords significant improvements in reliability and performance (e.g., spatial resolution, temperature resolution) over a wide range of operating conditions as compared to the Q-switched laser commonly used in the prior art DTS systems.

According to one embodiment of the invention, the drive circuitry of the laser source provides for independent control of optical power, pulse width, and frequency of the optical pulse train.

According to another embodiment of the invention, the optical amplifier is realized by an optical fiber amplifier whose pump signal is offset in wavelength and counter-propagating with respect to the optical pulse train, a Raman amplifier, or a semiconductor amplifier.

Additional objects and advantages of the invention will become apparent to those skilled in the art upon reference to the detailed description taken in conjunction with the provided figures.

DETAILED DESCRIPTION OF THE INVENTION

Figure 4:
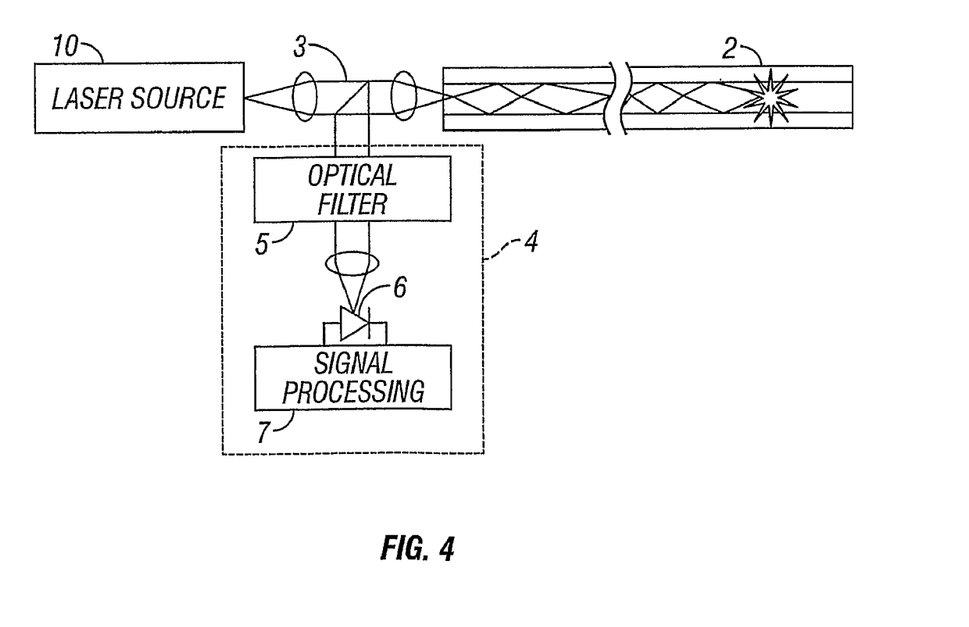
FIG. 4 is a functional block diagram of a fiber optic distributed temperature sensing system based on optical time-domain reflectometry, in which the present invention is used.

Turning now to FIG. 4, there is shown an exemplary DTS system that employs a pulsed-mode laser source 10 in accordance with the present invention. Details of the pulsed-mode laser source are described below with respect to FIGS. 5 and 6. The other elements of the DTS system (e.g., optical fiber 2, directional coupler 3, and optical filter 5) operate as described above with respect to FIG. 1.

Figure 5:
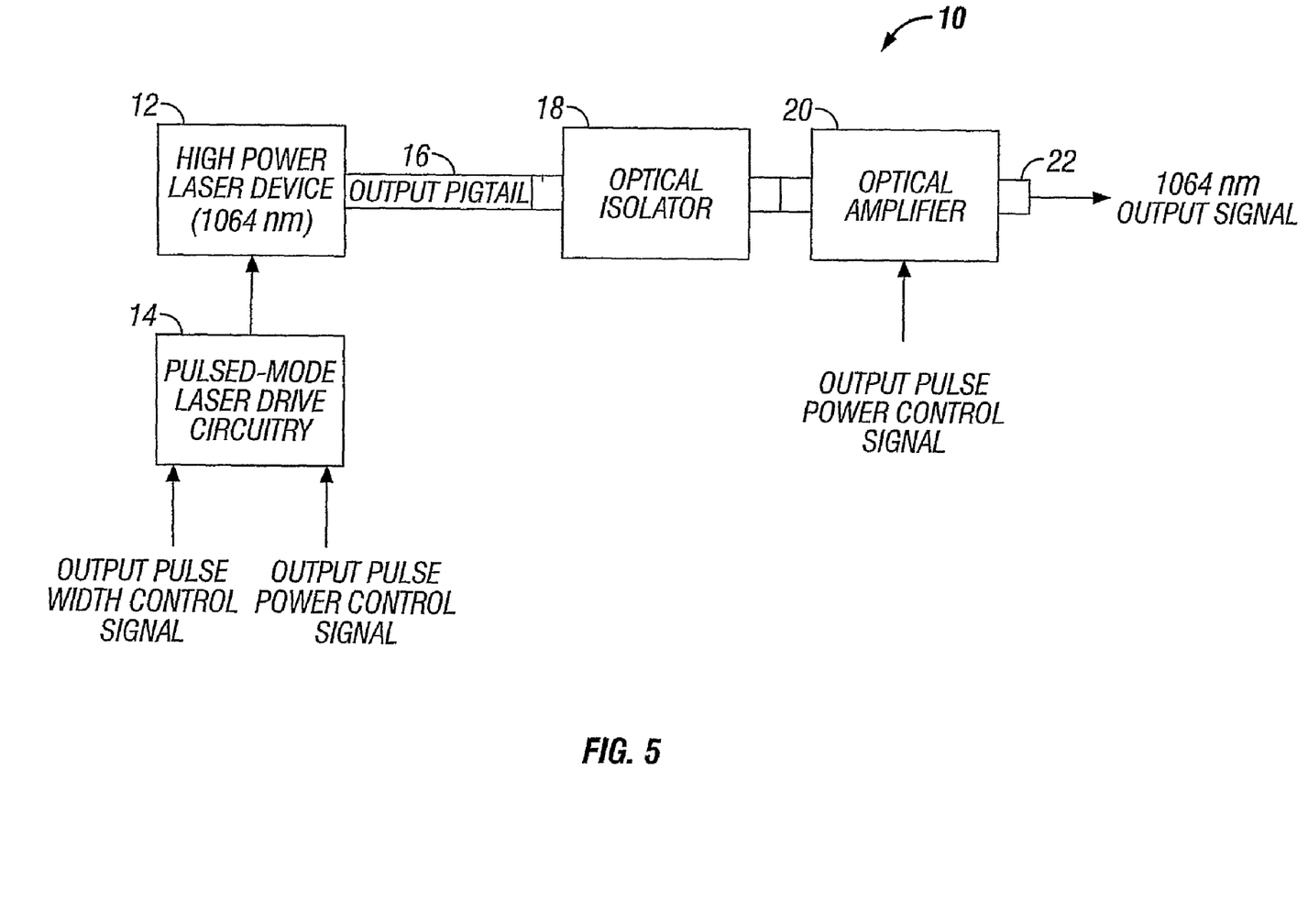
FIG. 5 is a functional block diagram of a pulsed-mode laser source in accordance with the present invention, which is suitable for use in the distributed temperature sensing system of FIG. 4.

As shown in FIG. 5, the pulsed-mode laser source 10 is realized by a laser device 12 that is capable of generating light at a characteristic wavelength in a range between 1050 nm and 1090 nm. The laser device 12 cooperates with pulsed-mode laser drive circuitry 14 to output such light as an optical pulse train. The optical pulse train is output from the laser device 12 via an output optical fiber pigtail 16 (e.g., a single mode fiber pigtail). The laser device 12 includes one or more resonant cavities fixed within a housing as is well known. The output optical fiber pigtail 16 is integral to the housing and is coupled to the emission output of the resonant cavity(ies) of the laser device 12. The output optical pulse train has an optical power typically greater than 100 mW at a characteristic pulse repetition frequency range between 1 and 50 kHz and with a characteristic pulse width range between 2 and 100 ns.

For example, the laser device 12 may be realized by a fiber pigtailed semiconductor laser module that operates at a wavelength of 1064 nm with an output power of up to 1 Watt at a characteristic pulse frequency up to 10 kHz and a characteristic pulse width of up to 0.2 µs, such as provided by the LU1064M150 module commercially available from Lumics GmbH of Berlin, Germany. The semiconductor laser module is typically realized by a diode defined by the interface of a p-type semiconductor region to an n-type semiconductor region. The diode interface is typically realized by one or more heterojunctions in order to reduce diffraction loss in the resonant cavity. Excitation is provided by current flowing through the interface. Optical feedback is provided by reflecting mirrors (which are typically provided by the cleaved ends of the diode itself with no further coating, or possibly with reflective coatings applied thereto). In addition, the output pigtail 16 may incorporate a fiber Bragg grating in order to stabilize the emission wavelength. The semiconductor diode element can be arranged as a side-emitting device, which typically forms an elliptical output beam, or a vertical cavity surface emitting device (VCSEL), which typically forms a circular shaped output beam, as are well known. The high power laser module may also employ a thermo electric cooler or a passive heat sink integral to its housing, as is well known.

In accordance with the present invention, the laser device 12 and drive circuitry 14 are arranged as a master-oscillator-power amplifier system wherein the output optical pulse train produced by the laser device 12 is supplied via the output pigtail 16 to an optical isolator 18 and optical amplifier 20. The optical isolator 18 is an optical filter that allows the output optical pulse train to pass through to the optical amplifier 20 yet blocks undesired light (e.g., those wavelengths outside the characteristic wavelength) from coupling back into the laser device 12. The optical amplifier 20 amplifies the optical power level of the optical pulse train supplied thereto. The amplified optical pulse train is output at port 22 to thereby produce an optical pulse train at the characteristic wavelength. The optical isolator 18 may be omitted in configurations where optical coupling between the optical amplifier 20 and laser device 12 is minimal.

The laser drive circuitry 14 is configured to provide the desired pulse characteristics (e.g., rise time, optical power, and width) of the output optical pulse train. Preferably, the laser drive circuitry 14 is adapted such that the pulse power and pulse width of the output optical pulse train are independently controllable in response to control signals supplied thereto (labeled "Output Pulse Power Control Signal" and "Output Pulse Width Control Signal" in FIG. 5). Such control signals may be generated by user-manipulated control knobs and/or through a programmed microprocessor that interacts with a user via a display and a keypad or other user input means (these are not shown for simplicity of description). In the preferred embodiment, the laser drive circuitry 14 is realized by a pulse generator that outputs an electrical pulse train in accordance with user-supplied parameters, including the desired pulse power and pulse width. This electrical pulse train is supplied to drive circuitry that sources (or sinks) the appropriate amount of current to the laser device 12 such that the laser device 12 produces an optical pulse train that corresponds to the electrical pulse train supplied thereto. The laser drive circuitry 14 may also interface to a thermo electric cooler (or other active cooling mechanism) to maintain the laser device 12 within its desired operating temperature range. The optical amplifier 20 may also be adapted to provide a variable amount of optical amplification in response to a control signal supplied thereto (labeled "Output Pulse Power Control Signal). In this manner, the laser drive circuitry 14 and/or the optical amplifier 20 may be used to adjust the optical power of the optical pulse train produced at port 22.

Figure 6:
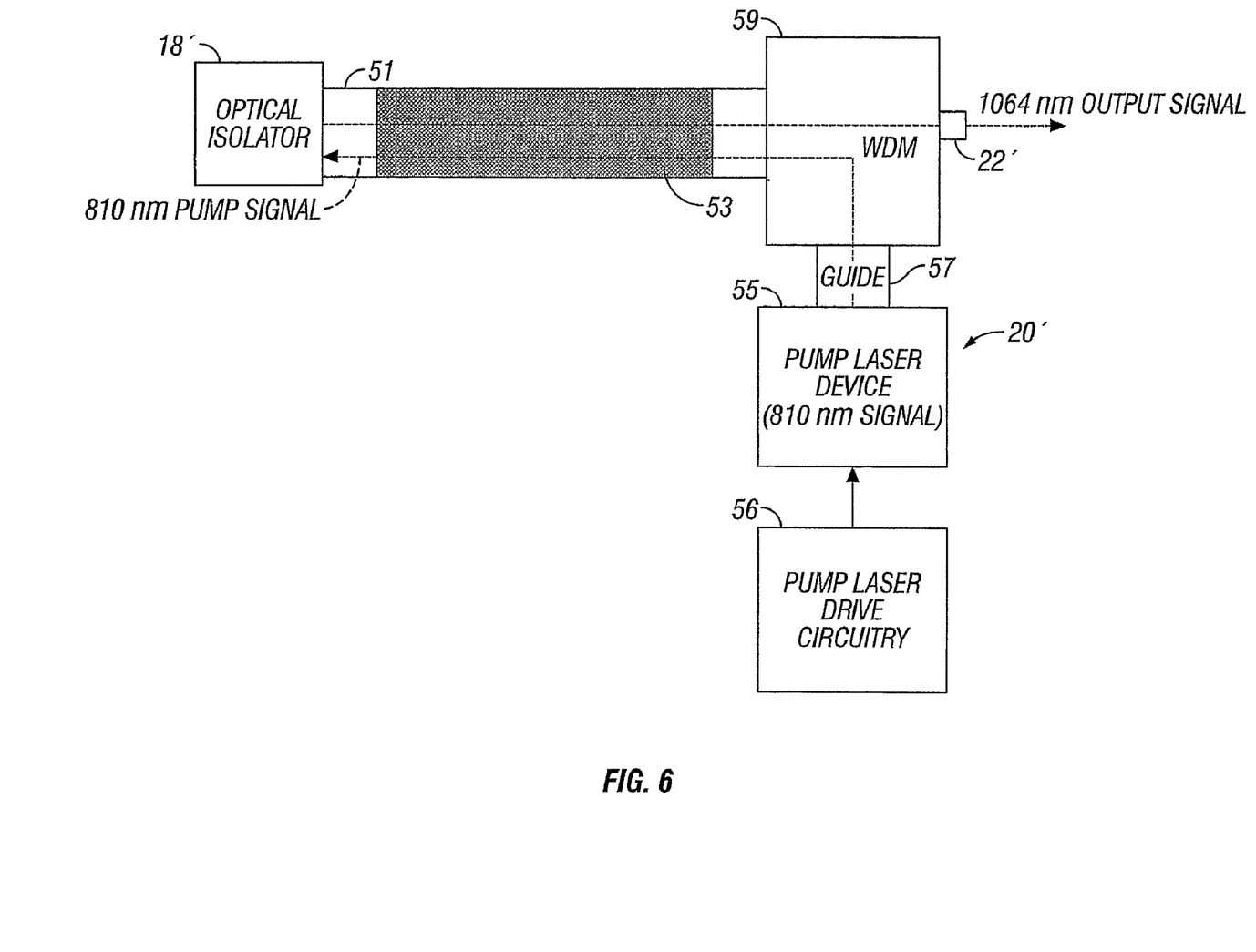
FIG. 6 is a functional block diagram of an exemplary optical amplifier that is suitable for use in the pulsed-mode laser source of FIG. 5.

In the preferred embodiment as shown in FIG. 6, the optical amplifier 20 is realized by an optical fiber amplifier 20' that includes a single-mode optical fiber 51 having a section 53 doped with Neodymium. The optical pulse train output by the master oscillator (laser device 12) is coupled into the optical fiber 51 such that it propagates along one direction (from left to right). A pump laser device 55 is provided that is capable of generating light at a characteristic wavelength (preferably at 810 nm). Pump laser drive circuitry 56 cooperates with the pump laser device 55 to generate such light as an optical pump signal. The optical pump signal is a continuous mode signal, but may also be modulated (e.g. to modify its spectrum). The optical pump signal is guided by a waveguide 57 (e.g., fiber or optics) to a wavelength division multiplexer (WDM) 59 that couples the optical pump signal into the optical fiber 51 preferably so that the optical pump signal propagates in the optical fiber 51 in a direction opposite that of the optical pulse train output by the master oscillator (e.g., in a counter-propagating configuration—from right to left). The optical pump signal excites the Neodymium ions in fiber section 53 and forms a population inversion, thus forming a reservoir of stored energy. The incident pulses in the optical pulse train output by the master oscillator release this stored energy through a process of stimulated emission that results in optical amplification. The wavelength division multiplexer 59 passes the optical pulse train as amplified by the fiber section 53 to the output 22'. The optical isolator 18' is preferably adapted such that substantially none of the counter-propagating optical pump signal is reflected back into the amplifying optical fiber 51. This has two advantages. Firstly, it ensures that substantially no pump light appears at the output 22'. Secondly, counter-propagation of the pump light and optical pulse train provides a slightly higher gain than co-propagation. The power of the optical amplification can be controlled by adjusting the optical power of the optical pump signal. This is typically accomplished by controlling the pump laser drive circuitry 56 to vary the drive current supplied to the pump laser device 55.

In certain applications, it may be desirable to minimize the coupling of light into the optical amplifier 20 from the remainder of the system. This may be accomplished by coupling the port 22 to an optical isolator that passes the desired optical pulse signal generated at port 22 yet blocks the unwanted light from coupling into the optical amplifier 20.

In other applications, spontaneous emission from the optical amplifier 20 can have detrimental effects on the measurement performance of the DTS system. These effects may be minimized by coupling an optical modulator port 22. The optical modulator is controlled in a synchronized manner with the optical pulse generation of the master oscillator such that it passes each desired output optical pulse yet returns to a blocking state when an optical pulse is not present. Such a modulator also has the benefit of providing reverse isolation from any light returning from the system at times other than when a desired output pulse is present. The modulator can take the form of an actively-controlled device, such as an acousto-optic, or electro-optic, modulator, or of a passively switched device, such as a saturable absorber.

In yet other applications, the reliability of the source may be particularly important. In such applications, more than one pump source may be used. In one example, this is achieved by multiplexing several pump sources that use closely-spaced but different pump wavelengths all within the absorption band of the amplifier dopant material (e.g., the Neodymium dopant of section 53), or that use polarization diversity multiplexing of a wavelength that is within the absorption band of the amplifier dopant material. In another example, an additional wavelength division multiplexing device is coupled between the isolator 18' and the optical fiber 51. This additional wavelength division multiplexing device couples a second optical pump signal (generated by a second pump source) such that it co-propagates with the optical pulse train along the optical fiber 51 to effectuate optical amplification. Likewise, several master laser sources may be multiplexed together to provide redundancy against the failure of any one of these sources. The multiplexing may use polarization multiplexing or closely spaced wavelength division multiplexing in the case where the source spectral requirements allow.

There have been described and illustrated herein several embodiments of a pulsed-mode laser source suitable for use in a distributed temperature sensing system (and a DTS system employing the same). While particular embodiments of the invention have been described, it is not intended that the invention be limited thereto, as it is intended that the invention be as broad in scope as the art will allow and that the specification be read likewise. Thus, while particular characteristics (e.g., power, pulse width, rise time) of the optical pulse generation capabilities of the laser source have been disclosed, it will be appreciated that such characteristics can be readily adapted depending on the desired application. In addition, while particular types of lasers and optical amplifiers have been disclosed, it will be understood that other types can be used. For example, and not by way of limitation, the optical amplifier of the laser source may be realized with a gain fiber doped with Ytterbium that is optically pumped with light preferably at around 940 nm, a Raman amplifier, a semiconductor optical amplifier, or other suitable optical amplification mechanism. Also, while a laser device operating at 1064 nm is preferred, it will be recognized that a laser device operating at a wavelength within or near the range between 1050 nm and 1090 nm can be used. Furthermore, while it is preferred that a fiber-pigtailed laser device be used, it will be understood that other suitable non-pigtailed laser devices can be similarly used. It will therefore be appreciated by those skilled in the art that yet other modifications could be made to the provided invention without deviating from its scope as claimed.

What is claimed is:

1. A laser source for use in a temperature sensing system based on optical time-domain reflectometry over an optical fiber sensor, the laser source comprising:

a laser device and drive circuitry that cooperate to emit an optical pulse train at a characteristic wavelength in a range between 1050 nm and 1090 nm, wherein the drive circuitry is configured to adjust at least one pulse characteristic of the optical pulse train in response to at least one signal corresponding to manipulation of a user input device, and wherein the laser device comprises: a semiconductor laser; at least one resonant cavity fixed within a housing; and an optical fiber pigtail that is integral to the housing and that is coupled to the emission output of the resonant cavity; and an optical amplifier, operably coupled to said laser device, adapted to optically amplify said optical pulse train for output over the optical fiber sensor.

2. A laser source according to claim 1, wherein: the characteristic wavelength of said optical pulse train is 1064 nm.

3. A laser source according to claim 1, wherein: the at least one pulse characteristic adjustable by the drive circuitry is selected from among a pulse width, power, and rise time.

4. A laser source according to claim 3, wherein: the optical amplifier is a variable amplifier to provide variable amplification.

5. A laser source according to claim 1, wherein: the at least one pulse characteristic includes an optical power and pulse width of said optical pulse train, and said drive circuitry is configured to independently control the optical power and pulse width of said optical pulse train in response to signals corresponding to manipulation of the user input device.

6. A laser source according to claim 1, wherein: said optical amplifier comprises a doped optical fiber that is pumped with a pump optical signal emitted by a pump laser device.

7. A laser source for use in a temperature sensing system based on optical time-domain reflectometry over an optical fiber sensor, the laser source comprising:
a laser device and drive circuitry that cooperate to emit an optical pulse train at a characteristic wavelength in a range between 1050 nm and 1090 nm, wherein the laser device comprises: a semiconductor laser; at least one resonant cavity fixed within a housing; and an optical fiber pigtail that is integral to the housing and that is coupled to the emission output of the resonant cavity; and
an optical amplifier, operably coupled to said laser device, adapted to optically amplify said optical pulse train for output over the optical fiber sensor,
wherein said optical amplifier comprises a doped optical fiber that is pumped with a pump optical signal emitted by a pump laser device, and
wherein said optical pulse train propagates along said doped optical fiber in a first direction, and said optical amplifier includes a wavelength division multiplexer that propagates said pump optical signal along said doped optical fiber in a second direction opposite said first direction.

8. A laser source for use in a temperature sensing system based on optical time-domain reflectometry over an optical fiber sensor, the laser source comprising:
a laser device and drive circuitry that cooperate to emit an optical pulse train at a characteristic wavelength in a range between 1050 nm and 1090 nm, wherein the laser device comprises: a semiconductor laser; at least one resonant cavity fixed within a housing; and an optical fiber pigtail that is integral to the housing and that is coupled to the emission output of the resonant cavity; and
an optical amplifier, operably coupled to said laser device, adapted to optically amplify said optical pulse train for output over the optical fiber sensor,
wherein said optical amplifier comprises a doped optical fiber that is pumped with a pump optical signal emitted by a pump laser device, and
wherein said doped optical fiber has a section doped with Neodymium.

9. A laser source for use in a temperature sensing system based on optical time-domain reflectometry over an optical fiber sensor, the laser source comprising:
a laser device and drive circuitry that cooperate to emit an optical pulse train at a characteristic wavelength in a range between 1050 nm and 1090 nm, wherein the laser device comprises: a semiconductor laser; at least one resonant cavity fixed within a housing; and an optical fiber pigtail that is integral to the housing and that is coupled to the emission output of the resonant cavity; and
an optical amplifier, operably coupled to said laser device, adapted to optically amplify said optical pulse train for output over the optical fiber sensor,
wherein said optical amplifier comprises a doped optical fiber that is pumped with a pump optical signal emitted by a pump laser device, and
wherein said doped optical fiber has a section doped with Ytterbium.

10. A laser source according to claim 6, wherein: said doped optical fiber is pumped with a plurality of pump optical signals emitted by a plurality of pump laser devices.

11. A laser source according to claim 10, wherein: said plurality of pump optical signals utilize closely-spaced but different characteristic wavelengths all within an absorption band of an dopant material of the doped optical fiber.

12. A laser source according to claim 10, wherein: said plurality of pump optical signals utilize polarization diversity multiplexing of a wavelength that is within an absorption band of a dopant material of the doped optical fiber.

13. A laser source according to claim 10, wherein: said optical pulse train propagates along said doped optical fiber in a first direction, and said optical amplifier includes a first wavelength division multiplexer that propagates a first pump optical signal along said doped optical fiber in a second direction opposite said first direction and a second wavelength division multiplexer that propagates a second pump optical signal along said doped optical fiber in said first direction.

14. A laser source according to claim 7, further comprising: an optical isolator that is adapted such that substantially none of said pump optical signal is reflected back for propagating in the first direction along said doped optical fiber.

15. A laser source according to claim 1, wherein: said optical amplifier comprises one of a Raman amplifier and a semiconductor optical amplifier.

16. A laser source according to claim 1, further comprising: an optical isolator operably coupled between the laser device and the optical amplifier.

17. A laser source according to claim 1, further comprising: an optical modulator operably coupled to an output of said optical amplifier, wherein said optical modulator is controlled in a synchronized manner with the optical pulse generation of the laser device such that said optical modulator passes each optical pulse of said optical pulse train yet returns to a blocking state when an optical pulse is not present.

18. A temperature sensing system comprising:
an optical fiber sensor;
the laser source of claim 1 for generating an optical pulse train;
a receiver, and
a directional coupler, operably coupled between said laser source and said optical fiber sensor, that is adapted to direct said optical pulse train over said optical fiber sensor and to direct scatter that propagates back along said optical fiber sensor to said receiver,
wherein said receiver is configured to generate an electrical signal representing said scatter and to process said electrical signal to derive a measurement of temperature along said optical fiber sensor.

19. The temperature sensing system according to claim 18, wherein:
said receiver includes an optical filter configured to block unwanted components in an optical signal supplied thereto and to pass desired components in the optical signal supplied thereto, a detector configured to receive the resultant optical signal output by the optical filter and to convert the resultant optical signal into said electrical signal, and signal processing circuitry configured to process said electrical signal as part of operations that derive the measurement of temperature along said optical fiber sensor.

20. The temperature sensing system according to claim 19, wherein: the desired components passed by the optical filter include at least one backscatter component that is shifted in wavelength from the characteristic wavelength of said optical pulse train that propagates along the optical fiber sensor.

21. The temperature sensing system according to claim 20, wherein: said backscatter component comprises a Brillouin backscatter component for the characteristic wavelength of said optical pulse train.

22. The temperature sensing system according to claim 20, wherein: said backscatter component comprises a Raman backscatter component for the characteristic wavelength of said optical pulse train.

23. A method of temperature sensing based on optical time domain reflectometry using an optical fiber sensor, comprising:

emitting, by a laser device in cooperation with drive circuitry, an optical pulse train, wherein the laser device comprises: a semiconductor laser; at least one resonant cavity fixed within a housing; and an optical fiber pigtail that is integral to the housing and that is coupled to the emission output of the resonant cavity;

providing at least one signal to the drive circuitry that corresponds to manipulation of a user input device, wherein the at least one signal causes the drive circuitry to adjust at least one pulse characteristic of the optical pulse train;

optically amplifying, using an optical amplifier, the optical pulse train for output over the optical fiber sensor; and determining a temperature in response to the optical pulse train output over the optical fiber sensor.

24. The method according to claim 23, the at least one pulse characteristic adjustable by the drive circuitry is selected from among a pulse width, power, and rise time.

* * * * *